March 7, 1950          P. S. CRAIG          2,499,727
ELECTRICALLY OPERATED LOCK FOR MOTOR VEHICLES
Filed March 23, 1948          2 Sheets—Sheet 2
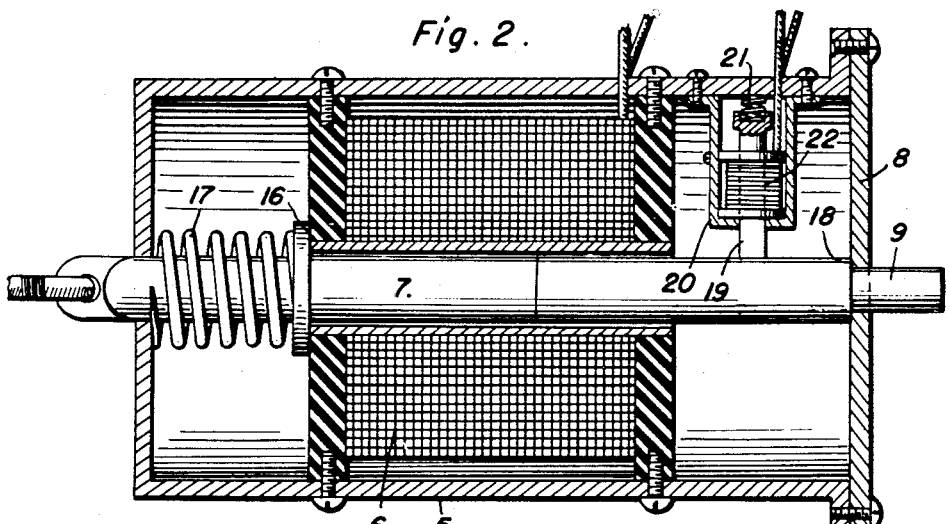
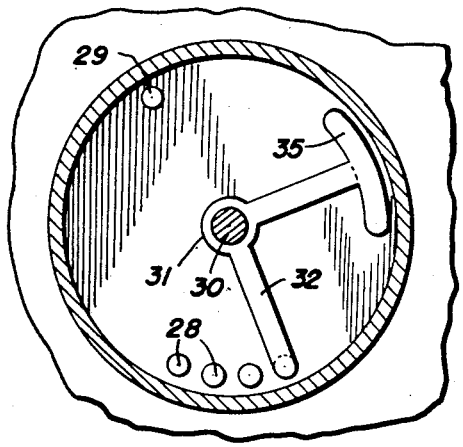
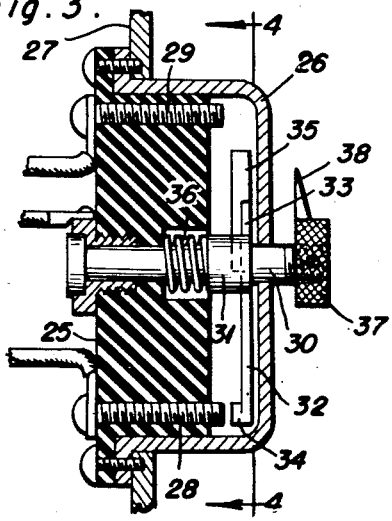
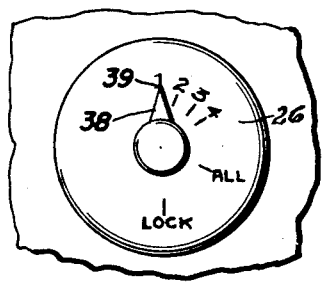
Paul S. Craig
INVENTOR.

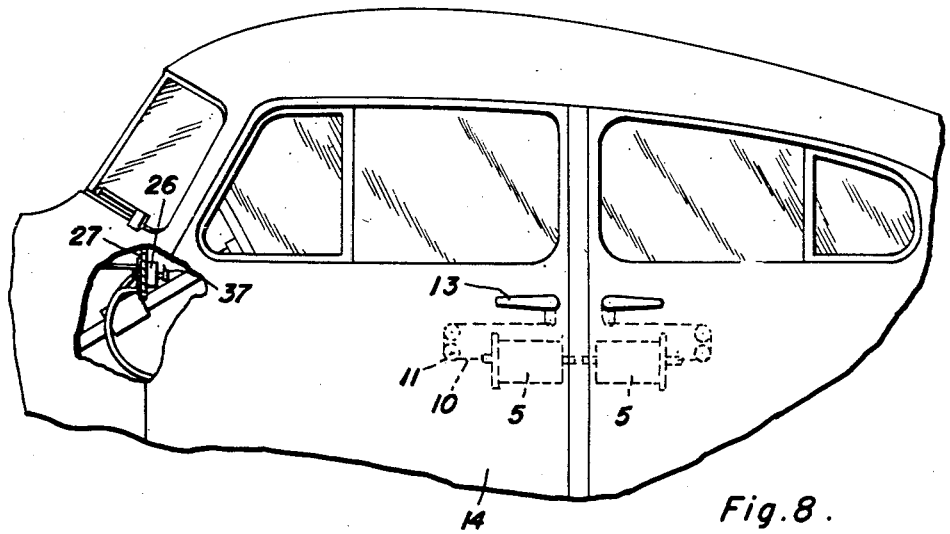
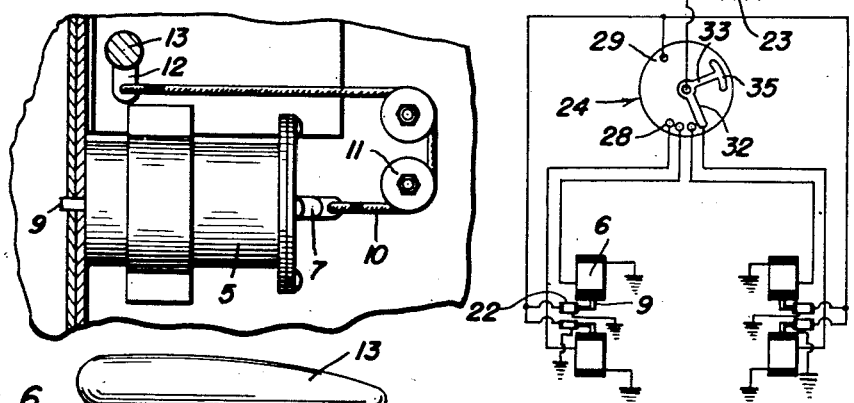
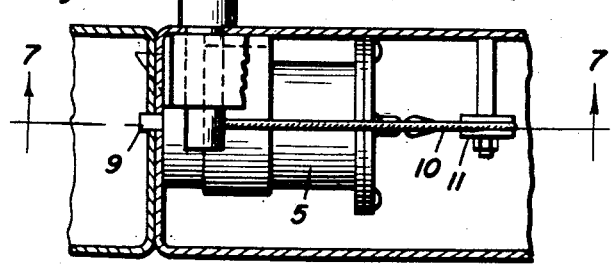

Patented Mar. 7, 1950

2,499,727

UNITED STATES PATENT OFFICE 2,499,727

ELECTRICALLY OPERATED LOCK FOR MOTOR VEHICLES

Paul S. Craig, State College, Pa.

Application March 23, 1948, Serial No. 16,486

1 Claim. (Cl. 292—33)

The present invention relates to new and useful improvements in electrically operated locks for automobile doors and other motor vehicles whereby the lock for each of the doors may be controlled by the driver of the vehicle from a point adjacent the steering wheel thereof.

An important object of the invention is to provide a spring projected sliding bolt for each door of the vehicle having electrically operated means for retracting the bolt together with electrically operated locking means for holding the bolt in its retracted position.

A still further object of the invention is to provide a selector switch for controlling the retracting movements of the bolts for the individual doors, or for controlling the retracting movements of all of the bolts simultaneously together with means for simultaneously releasing the locking means for the bolts.

A still further object is to provide manual means for retracting the bolts, should the electric means fail.

A still further object is to provide an apparatus of this character of simple and practical construction, which is efficient and reliable in operation, relatively inexpensive to manufacture and install in operative position on the vehicle and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary side elevational view of an automobile showing the electrically operated locks carried by the doors and with parts broken away and shown in section to show the position of the selector switch for the locks;

Figure 2 is an enlarged longitudinal sectional view of one of the solenoid operated sliding door bolts;

Figure 3 is an enlarged transverse sectional view of the selector switch;

Figure 4 is a sectional view taken substantially on a line 4—4 of Figure 3;

Figure 5 is a view in elevation of the control knob for the selector switch;

Figure 6 is a side elevational view of one of the electrically operated door bolts with parts shown in section and showing the door handle operating means for retracting the bolts;

Figure 7 is a sectional view taken substantially on a line 7—7 of Figure 6; and, Figure 8 is a diagram of the electric circuit for the electrically operated bolts and the selector switch therefor.

Referring now to the drawings in detail wherein for the purpose of illustration I have disclosed a preferred embodiment of the invention, the numeral 5 designates a cylindrical lock casing having a solenoid 6 positioned therein, the solenoid including a sliding armature or core 7. One end of the core projects through an adjacent end 8 of the casing and is reduced to provide a locking bolt 9 while the opposite end of the core projects from the opposite end of the casing and to which a cable 10 is attached trained over pulleys 11 and attached to an arm 12 on the inside of a door knob 13 for retracting the bolt from the outside of an automobile door 14.

The core 7 adjacent its end provided with the cable 10 is formed with a flange 16 against which one end of a coil spring 17 abuts to move the bolt 9 into its projected position for locking the door.

The inner end of the bolt 9 is formed with a shoulder 18 engageable by a plunger 19 slidable in a casing 20 secured to the inside of casing 5, the plunger being projected by a coil spring 21 into a position for engaging shoulder 18 to lock the bolt 9 in its retracted position. The plunger 19 forms the core for a second solenoid 22 positioned in casing 20.

The bolt 9 is retracted by energizing solenoid 6 to unlock the door and the plunger 19 is retracted by energizing solenoid 22.

The solenoids 6 and 22 for each door of the automobile are suitably grounded, as shown in Figure 8, and connected in a circuit with the battery 23 of the vehicle and the solenoids for the respective doors are controlled by a selector switch designated generally at 24.

The selector switch comprises a switch block 25 of insulation material provided with a cap 26 and secured to the front surface of the instrument panel 27 of the vehicle. A stationary contact 28 for each solenoid 6 is carried by the block 25 and projects into the cap 26, the stationary contacts 28 being grouped at one side of the block 25 and a single stationary contact 29 is similarly carried by block 25 for all of the plunger releasing solenoids 22 for the several bolts 9.

A shaft 30 is rotatably mounted in block 25 and projects outwardly of cap 26, the shaft forming a conductor for the circuit and to which a collar 31 is secured having a pair of arms 32 and 33 projecting radially therefrom, the arm 32 providing a movable contact 34 and the arm 33 providing a movable contact 35 for movement into and out of engagement with the stationary contacts 28 and 29 by a rotation of shaft 30.

The shaft 30 is also slidable in block 25 and cap 26 and is normally projected forwardly by a coil spring 36 engaging collar 31 to hold contacts 34 and 35 spaced from the stationary contacts 28 and 29 as shown in Figure 3 of the drawings.

The knob 37 of insulation material is secured to the outer end of shaft 30 and is provided with a pointer 38 traveling over indicia 39 on the outer surface of cap 26 to indicate the position of the contacts with respect to the stationary contacts 28 and 29.

In the operation of the device the bolts 9 are held in a projected position for locking the doors 14 by the coil spring 17 and the bolts for the respective doors are selectively retracted by turning knob 37 of selector switch 24 into a position as shown by the marks 1, 2, 3, 4 of indicia 39 to engage contact 34 with a proper stationary contact 28 and pushing the knob 37 inwardly to close the circuit for the solenoid 6. If it is desired to simultaneously retract all of the bolts 9, the contact 35 is turned into a position, indicated by the position "All" of the indicia 39, for bridging all of the contacts 28.

The bolt 9 is held in its retracted position by the plunger 19 which engages shoulder 18 and is held in position by coil spring 21 to hold the bolt in its unlocked or retracted position.

The plungers 19 for the several doors are simultaneously released by turning knob 37 into a position designated by the legend "Lock" of the indicia 39, for engaging stationary contact 29 with either contact 34 or 35.

Should the electric system for the bolts fail and with the bolts in their projected position the doors may be unlocked from the outside of the vehicle by turning handle 13 in a direction to exert a pulling force on cable 10 which thus retracts the bolts.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In a lock operating mechanism for a series of locks of the type having a bolt-operating solenoid and a bolt locking solenoid, comprising a group of stationary contacts connected to the bolt operating solenoids and a single stationary contact connected to the bolt locking solenoids, and a pair of movable contacts selectively engageable with the stationary contacts and connected to a source of electric current, one of said movable contacts being successively engaged individually with the group of stationary contacts and the other of said movable contacts being engaged simultaneously with all of the stationary contacts of said group and either of said movable contacts being engageable with the single stationary contact.

PAUL S. CRAIG.

REFERENCES CITED

The following references are of record in the file of this patent:

UNITED STATES PATENTS

| Number | Name | Date |
| --- | --- | --- |
| 342,748 | Howell | May 25, 1886 |
| 784,064 | Nordenberg | Mar. 7, 1905 |
| 1,262,651 | David | Apr. 16, 1918 |

FOREIGN PATENTS

| Number | Country | Date |
| --- | --- | --- |
| 26,560 | Great Britain | 1906 |
| 358,586 | Great Britain | Oct. 12, 1931 |